US011635499B2

(12) United States Patent
Orchard et al.

(10) Patent No.: US 11,635,499 B2
(45) Date of Patent: Apr. 25, 2023

(54) PHASE NOISE COMPENSATION SYSTEM, AND METHOD

(71) Applicant: QINETIQ LIMITED, Farnborough (GB)

(72) Inventors: David Arthur Orchard, Malvern (GB); Peter David Kightley, Cheltenham (GB); Malcolm David Macleod, Malvern (GB)

(73) Assignee: QINETIQ LIMITED, Farnborough (GB)

( * ) Notice: Subject to any disclaimer, the term of this patent is extended or adjusted under 35 U.S.C. 154(b) by 1207 days.

(21) Appl. No.: 16/099,084

(22) PCT Filed: May 4, 2017

(86) PCT No.: PCT/EP2017/060711
§ 371 (c)(1),
(2) Date: Nov. 5, 2018

(87) PCT Pub. No.: WO2017/191285
PCT Pub. Date: Nov. 9, 2017

(65) Prior Publication Data
US 2019/0195994 A1    Jun. 27, 2019

(30) Foreign Application Priority Data

May 5, 2016    (GB) .................................... 1607875

(51) Int. Cl.
| G01S 7/497 | (2006.01) |
| G01S 17/36 | (2006.01) |
| G01S 7/4915 | (2020.01) |
| G01B 9/02055 | (2022.01) |
| G01S 7/35 | (2006.01) |

(Continued)

(52) U.S. Cl.
CPC .......... G01S 7/497 (2013.01); G01B 9/02065 (2013.01); G01B 9/02083 (2013.01);

(Continued)

(58) Field of Classification Search
CPC ........ G01S 7/497; G01S 7/354; G01S 7/4004; G01S 7/4915; G01S 13/346;

(Continued)

(56) References Cited

U.S. PATENT DOCUMENTS 3,458,259 A    7/1969   Bagley et al.
5,696,515 A  * 12/1997   Zyren ................ B60G 17/0165
                                              342/111

(Continued)

FOREIGN PATENT DOCUMENTS

DE    10 2015 100 804 A1    7/2016
WO       2006/103391 A1    10/2006

OTHER PUBLICATIONS

Apr. 5, 2017 Search Report issued in British Patent Application No. 1607875.0.

(Continued)

*Primary Examiner* — Joseph G Ustaris
*Assistant Examiner* — Jimmy S Lee
(74) *Attorney, Agent, or Firm* — Oliff PLC

(57) ABSTRACT

A system for compensating for phase noise, with particular application in lidar, includes a compensation interferometer that receives a signal from a source, and splits it into a first and second path, with a path length difference $\Delta\tau$ between them. Typically the path length is significantly less than that of the return distance to a target. The output of the compensation interferometer, which consists of phase noise generated in time $\Delta\tau$ is vectorially summed during a time similar to a signal flight time to a target, and the result used to reduce phase noise present on measurements of a target. It further includes means for selecting $\Delta\tau$ such that competing noise elements are reduced or optimised.

19 Claims, 2 Drawing Sheets

Figure 1:
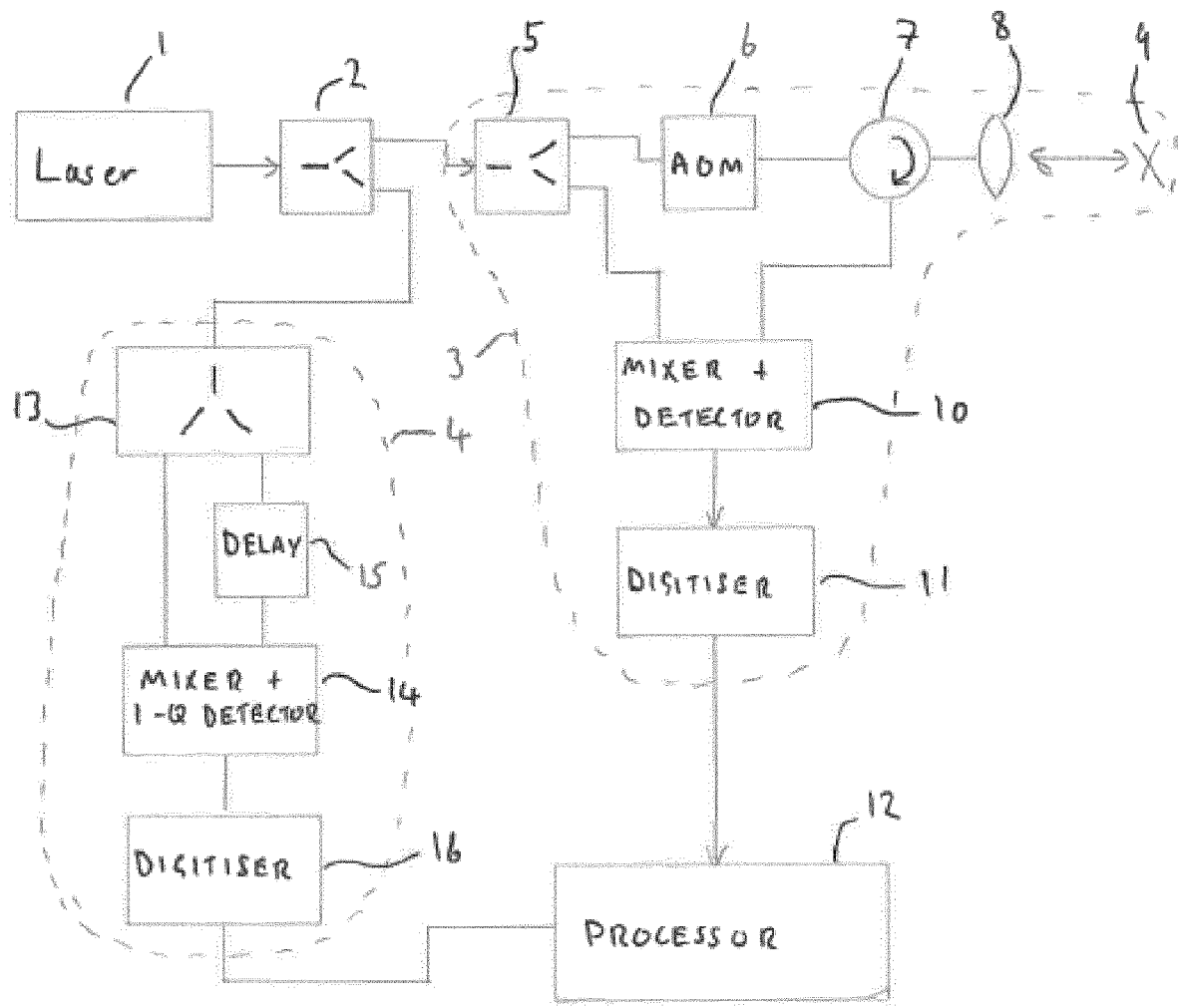

(51) Int. Cl.
*G01S 7/40* (2006.01)
*G01S 13/34* (2006.01)
*G01B 9/02* (2022.01)
*G01S 13/86* (2006.01)
*G01S 17/06* (2006.01)
*G01S 17/88* (2006.01)
*G01S 13/02* (2006.01)

(52) U.S. Cl.
CPC ............ *G01S 7/354* (2013.01); *G01S 7/4004* (2013.01); *G01S 7/4915* (2013.01); *G01S 13/346* (2013.01); *G01S 13/865* (2013.01); *G01S 17/06* (2013.01); *G01S 17/36* (2013.01); *G01S 17/88* (2013.01); *G01S 2013/0236* (2013.01)

(58) Field of Classification Search
CPC ........ G01S 13/865; G01S 17/06; G01S 17/36; G01S 17/88; G01S 2013/0236; G01B 9/02065; G01B 9/02083
USPC ........................................................ 356/5.01
See application file for complete search history.

(56) References Cited

U.S. PATENT DOCUMENTS

| 6,278,398 | B1 | 8/2001 | Vossiek et al. | |
|---|---|---|---|---|
| 6,771,721 | B1* | 8/2004 | Rostamy | H04B 1/1081 329/304 |
| 2006/0182383 | A1 | 8/2006 | Slotwinski | |
| 2009/0091446 | A1* | 4/2009 | Jang | G08B 13/184 340/557 |
| 2009/0185176 | A1* | 7/2009 | Livingston | H01S 3/1307 356/237.2 |
| 2009/0251361 | A1 | 10/2009 | Beasley | |
| 2013/0113651 | A1* | 5/2013 | Leise | H01Q 21/061 342/146 |
| 2014/0269790 | A1* | 9/2014 | Sebastian | H01S 3/0085 372/20 |
| 2014/0368832 | A1* | 12/2014 | Salvade | G01B 5/008 356/497 |
| 2015/0160335 | A1* | 6/2015 | Lynch | G01S 13/4418 342/194 |
| 2015/0308811 | A1* | 10/2015 | Feneyrou | G01B 9/02083 356/477 |
| 2016/0170023 | A1 | 6/2016 | Rondeau et al. | |
| 2018/0073932 | A1* | 3/2018 | Minet | G01J 9/04 |

OTHER PUBLICATIONS

Sep. 1, 2017 International Search Report issued in International Patent Application No. PCT/EP2017/060711.

Sep. 1, 2017 Written Opinion of the International Searching Authority issued in International Patent Application No. PCT/EP2017/060711.

* cited by examiner

PHASE NOISE COMPENSATION SYSTEM, AND METHOD

This invention relates to optical systems, such as LIDARs or other optical sensing systems, and also to non-optical systems such as radars particularly those that use coherent processing of optical signals.

It is common in some industries to use systems, such as LIDAR systems, to perform remote measurements. Typically, this may be a vibration or movement of, or even merely the presence of some remote article, or may be a vibration or movement of the medium, such as an optical fibre, in which a light beam is travelling.

Coherent LIDAR systems exploit the high optical frequency and short wavelength of light for high precision metrology. In a typical system, a probe beam is generated by a laser and transmitted to a remote target, which reflects some light back to the transmitter with modified characteristics, such as phase changes or frequency shifts. The modifications are then measured by using an interferometer to compare the reflected light with a 'local copy' of the laser light; the 'local oscillator'. Given an appropriate modulation applied to the transmitted light, the range or some other property of the target can be measured.

Ideally, the local oscillator should be fully coherent with the captured light backscattered from the target, so that a comparison of the two reveals only those changes imposed on the light over the round-trip path to the target. However, in a practical system the local oscillator is typically a sample of the laser light taken some time, $\tau$, after the measurement light was transmitted. The resulting measurement is therefore a combination of both the changes along the measurement path and any changes to any properties of the laser light itself during the intervening time $\tau$. Real lasers exhibit phase noise, which adds noise to any measurements. The noise increases with $\tau$, until the signal to noise ratio (SNR) degrades to the point where phase or frequency measurements are no longer of value. Since $\tau$ is typically the round-trip time to the target and back, this sets a practical upper limit to the measurement range.

There are two common approaches to minimising the effects of phase noise in a coherent LIDAR system. The first approach is to minimise the phase noise of the laser itself. Specialised low-noise lasers are made specifically for LIDAR applications and are suitable for ranges of typically up to a few km, depending on the type of measurement. The second approach is to minimise the time offset $\tau$. This can be done by including a delay line in the LIDAR system so that the local oscillator reaches the interferometer some time after it is derived from the laser. If the delay line effective length matches the round-trip to the target, $\tau$ reduces to zero and the effects of phase noise can be eliminated entirely. The delay line can be implemented as a length of optical fibre. Delays of a few km are practicable in some applications. This approach has been used successfully in a number of applications but there are drawbacks. Firstly, the range may be too great for a delay line to be practical, particularly for very-long range applications and/or applications facing very stringent size and weight constraints. Secondly, the delay coil may itself act as a sensor and introduce unwanted modulation on the laser light, which is an effect that gets worse as the delay line increases in length. Finally, exact cancellation of phase noise only occurs for one specific range.

Prior patent application US2015/0308811 describes a scheme adapted to provide some compensation of phase noise in modulated laser lidar systems.

It is an aim of the present invention to provide alternative systems that at least partially overcome some of the disadvantages of the prior art.

According to a first embodiment of the present invention there is provided a system comprising:
a) a signal generator for providing a signal,
b) a splitter for splitting the signal from the signal generator and directing it to a measurement path and a compensation path, wherein:
   i) the measurement path comprises a measurement interferometer having a splitter for splitting the signal into a first and a second part, the interferometer being arranged to transmit the first part to a remote target, and to receive reflections therefrom, and to combine the received reflections with the second part in a mixer, and
   ii) the compensation path comprises a compensation interferometer arranged to split its input signal into a first, delayed path, and a second, undelayed path, and to combine the first and second paths in a mixer to produce an output bearing information pertaining to a phase difference between the two paths, the relative delay between the first and second paths being a predetermined time $\Delta\tau$;
c) sampling means for sampling the outputs of the measurement interferometer mixer and the compensation interferometer mixer
d) processing means for calculating a phase compensation figure by summing a number n of the $\Delta\tau$-induced phase difference samples from the compensation path to calculate a phase change over a time $n\Delta\tau$, and for subtracting the calculated phase change from the output of the measurement interferometer.

It will be appreciated that embodiments of the system are able to remove or reduce the phase noise present on the output of the measurement interferometer, while not affecting other properties, such as phase changes and other modulations that may be imparted to the signals by the remote target. Thus, the system is able to provide as an output information relating to properties of the target, in the normal manner.

Although the invention is described primarily in relation to optical systems, it will be appreciated that it has equal applicability in radio frequency (RF) (e.g. radar systems operative at up to approximately 300 GHz). References to optical systems and components should, where the context allows, also be taken (with appropriate modification, as would be understood by a person of ordinary skill in the art) as references to functionally equivalent RF systems.

Optical systems according to embodiments of the invention will typically use a laser as the signal generator, whereas embodiments operating at radio frequencies, such as radars, will generally use an RF signal generator.

The delay path of the compensation interferometer may comprise, in either optical or RF systems, an optical fibre. For example RF systems may have means for converting RF signals to optical frequencies before sending the signal into an optical fibre, and may have means for converting the optical frequencies back to RF at the output of the optical fibre. Alternatively, RF systems may employ a coaxial cable delay line in the delay path.

The use of a separate compensation interferometer, that is used to calculate phase changes in the signal generator (due to phase noise) in discrete steps up to a working range of the measurement interferometer allows a particularly compact system to be provided, as the delay path, and hence an associated delay coil in the compact interferometer is typically much shorter than the operating range of the optical system.

This provides significant benefits where the system is a LIDAR or radar and the desired measurement range is of the order 1 to km or above, and will also have benefits outside of this range also. Some embodiments may, for example, be employed on aircraft or satellites, and be used with slant ranges of 10 km, 30 km, 100 km, 200 km, or even more. Traditional systems wanting to compensate for phase noise in the signal generator would require an interferometer with a delay loop simulating this range, which may be impractical and compensates for a single range only. The invention allows much shorter lengths—typically of the orders 1 m to 200 m, and more typically 2 m to 50 m—to be used, which are comparatively small and light. The phase noise of successive transmissions, each of time duration $\Delta\tau$ through the delay line is summed to provide the total phase noise over the n periods. This may be done in a real-time, or near real-time manner, or may be done in subsequent post-processing of a recorded measurement signal.

Advantageously, the processing means may be arranged to calculate a range to the target based upon the output from the measurement interferometer, said range giving a time delay $\tau$ to the received reflections as compared to the second part of the first beam, and to subtract, from the output of the measurement interferometer, a phase compensation figure chosen such that $|\tau - n\Delta\tau| \leq \Delta\tau/2$. Thus, it will be appreciated that the differential phase noise over integer multiples of discrete lengths (or equivalently delay times $\Delta\tau$) of the delay line used in the compensation interferometer can be calculated, and subtracted from the output of the measurement interferometer. This compensates for the effects of laser phase noise in the measurement interferometer, apart from a small residual path difference $\tau - n\Delta\tau$. The length of the delay coil can be chosen so that the residual path difference is of low significance for the measurements. For optimal phase noise compensation, the correct value of n should be selected. This implies a-priori knowledge of round trip time delay $\tau$. In some applications $\tau$ may be known from some other source with sufficient accuracy. In others $\tau$ may be the parameter of interest. In this case, a phase insensitive measure (e.g. amplitude modulation) might be used to establish $\tau$ with sufficient accuracy to select n, or $\tau$ might be selected on the basis of phase noise minimisation (or, equivalently, SNR maximisation).

It will be appreciated that, in some applications, the phase noise present on the signal generator may be low enough so that there may be two or more, or even several values for n, which may lie either side of the optimal choice, that will still provide a beneficial reduction of the phase noise on the measurement interferometer, which may be suitable for some applications. Thus, an approximate or estimated value for n may be used in such embodiments.

Accordingly, some embodiments of the invention are arranged to select a value for n based on an estimate of the range to the target, and to subtract from the output of the measurement interferometer, a phase compensation figure summed over a time $n\Delta\tau$ In practice, the choice for delay coil length $\Delta L$ is a trade-off between error caused by this residual phase error, after subtraction of the $n\Delta T$ values, and any errors introduced in making the n phase measurements. The optimum length of the delay line, and hence the values of n and $\Delta\tau$ may therefore be chosen dependent upon a given application, and are preferably chosen to reduce residual phase noise following the processing carried out in step (d). If the coil is long, the error arising from the residual path difference could be large. Conversely, if the coil is short, the phase correction will be constructed from the sum of many measurements, each of which has an associated error. If n is large the cumulative error could also grow to unacceptable levels.

Thus, advantageously, the delay time $\Delta\tau$ of the compensation interferometer may be chosen based upon a combination of errors associated with multiple measurement of the phase error, and the size of the value $\Delta\tau/2$ (i.e. the maximum phase error when an optimal choice of n is made).

In some embodiments the optical system may be arranged to have a delay time $\Delta\tau$ of the compensation interferometer many times less than $\tau$; e.g. of less than 10%, or more advantageously. less than 1% of an expected in-use target range.

Advantageously, the measurement path may contain a modulator for modulating the first beam before it is transmitted to the target. Thus the optical system may take advantage of known techniques such as pulse compression, or phase coding of the transmitted signal. The modulator may conveniently be an acousto-optic modulator.

Preferably, the compensation interferometer mixer provides a complex output allowing in-phase (I) and quadrature (Q) signals to be extracted. This may be in the form of direct I and Q outputs, or may be in any other form. This allows the system to function even when no modulation is applied to the optical signal before it is applied to the compensation interferometer. This therefore allows the phase noise compensation process to be dependent just upon the output of an unmodulated laser, rather than having to modulate the laser source itself. This is in contrast to the prior art, which is only able to operate on modulated signals, such as a modulated laser source, as it is reliant on a beat signal being present on a compensation interferometer output.

Sampling of the outputs of the measurement and compensation interferometers may conveniently be carried out at the same rates, although this is not a requirement of the invention. The sampling of the compensation interferometer should be carried out at a rate sufficient to faithfully capture phase noise in the spectral band of interest. A summation of the samples therefore gives a measurement of the phase change through the time duration covered by the sampling process.

Conveniently, some embodiments of the invention are arranged to calculate values of phase noise compensation for different target ranges, which are used to correct the output of the measurement interferometer at different ranges. This allows compensation of the measurement for either multiple discrete targets at differing ranges simultaneously, or for targets that appear distributed over a significant range.

According to a second aspect of the invention there is provided a method for compensating for phase noise in a LIDAR or radar, comprising the steps of:
i) generating a signal;
ii) splitting the signal into a measurement signal and a compensation signal;
iii) transmitting a first part of the signal in the measurement path to a remote target, and mixing returns from the remote target with a second part to down-convert the returns;
iv) passing the compensation signal into an interferometer having a delayed, and an undelayed path, wherein the delayed path has a delay $\Delta\tau$ that is <10% of a delay $\tau$ undergone by returns from the remote target;
v) measuring a differential phase across n contiguous passes of the signal through the interferometer;

vi) subtracting the measured differential phase from the down-converted returns of step (iii).

The delay of the delayed path of the interferometer in step (iv) may advantageously be <1% of the delay undergone by the returns.

Advantageously, n is chosen in step (v) such that $|\tau - n\Delta\tau| \leq \Delta\tau/2$.

It will be appreciated by the normally skilled person that optical path lengths and physical path lengths may, and generally do, differ, due to refractive index of the medium in which the signal is passing through, and account should be taken of this where necessary in calculating lengths of cables and optical fibres etc.

Figure 2:
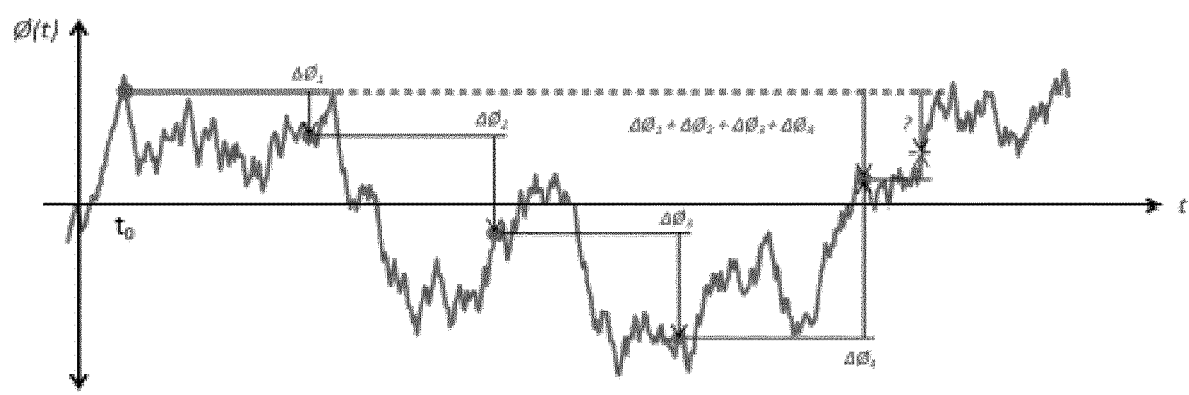

The invention will now be explained in more detail, by way of example only, with reference to the following figures:

FIG. 1 shows a high level block diagram of a system according to an embodiment of the present invention; and FIG. 2 diagrammatically illustrates an example phase error signal, being tracked by multiple samples.

FIG. 1 shows a simplified block diagram of a system according to one embodiment of the present invention. The system is a long range LIDAR. A laser 1 feeds a splitter 2, which in turn supplies EM energy from the laser to a measurement interferometer 3 and a compensation interferometer 4.

The measurement interferometer 4 has a splitter 5, for splitting the laser light into two paths—a transmission path and a reference path. The transmission path comprises an acousto-optic modulator 6, a circulator 7, and transmission/reception optics 8, which transmit EM energy to a target scene 9 and receive reflections back therefrom. The returning energy passes through the circulator to an output path into a mixer 10, which also has as an input the energy from the splitter 5 that is directed to the reference path. Thus, the mixer 10 mixes energy that is returned from a distant target, and has a delay τ with respect to energy from the laser that has no effective delay applied thereto. The output of the mixer includes phase noise due to the incoherence of the laser that accumulates over the time τ. This output is digitised, in digitiser 11, and sent to processor 12.

The compensation interferometer 4 comprises of a splitter 13 that splits its input EM energy into two paths, with the first path going straight to one input of a phase sensitive detector 14, and the other input feeding a fibre delay line 15 of 20 m length (generating a delay $\Delta\tau$), before going to a second input of the phase sensitive detector. The phase sensitive detector comprises a 3×3 splitter, with the 3 outputs feeding individual detectors, the outputs of which are digitised in digitiser 16. These measurements can be resolved to provide the differential phase noise that occurred in the time period $\Delta\tau$. An algebraic summation of successive differential phase measurements provides a measure of the differential phase noise over the equivalent summed length (in distance or time, as appropriate). The processor is able to calculate the differential phase noise values over any desired length, and to then subtract this from the phase information derived from mixer 10.

This embodiment is intended for implementation in a LIDAR having a slant range of approximately 30 km. Thus, it will be seen that the 20 m delay line is significantly smaller than one that would conventionally be used to balance a 60 km free-space time delay.

The compensation interferometer is, in this embodiment, implemented in polarisation maintaining fibre. It is beneficial to have means, such as this, to control polarisation, as it helps to maintain an adequate and stable interference signal.

FIG. 2 shows a simulated example of absolute phase noise, as may be present on a laser, and any other component up-stream of splitter 2 that might impart phase noise. The horizontal axis represents time, and the vertical axis represents phase instability over time. It can be seen that the phase noise varies randomly, typically exhibiting '1/f' or 'flicker' noise characteristics. Four measurements of differential phase noise over optical path difference $\Delta\tau$ are marked on the graph, spanning $t_0 \rightarrow t_0+\Delta\tau$, $t_0+\Delta\tau \rightarrow t_0+2\Delta\tau$ etc.

Each measurement gives the differential phase change since the previous one. The algebraic sum of the four differential phases $\Delta\phi_1$, $\Delta\phi_2$, $\Delta\phi_3$ and $\Delta\phi_4$ gives the total phase change $\Delta\phi_n$ corresponding to differential path length $4\Delta\tau$. In practice, the range to a target (or more accurately, the relative delay in the measurement interferometer caused by the distance of the target, and associated systematic path differences in the interferometer) is unlikely to be an exact multiple of $\Delta\tau$. Assuming, for example's sake, that the two-way time of flight is slightly greater than $4\Delta\tau$, then the unknown differential phase noise, taken from time $t_0$ is as indicated by the question mark. Subtraction of the value $\Delta\phi_n$ from the output of the measurement interferometer therefore leaves this error still present on the signal. This error however is small, and as shown above is no greater than the phase noise due to a delay of $\Delta\tau/2$ in the measurement interferometer, and can be controlled within limits by appropriate choice of the size $\Delta\tau$ and the inherent phase noise of the laser.

The uncompensated phase error cannot be discounted. Neither can the phase noise introduced through measurement error on the compensation value. It will be appreciated that the smaller the value of $\Delta\tau$ the smaller the uncompensated differential path length, but the higher the value of n results in higher overall measurement noise, and vice-versa.

The residual phase noise can be written as the quadrature sum of these two independent sources of error:

$$\sigma_{phase} = \sqrt{\left(\left[\int_{f_{Low}}^{f_{High}} |\Phi(f)|^2 df\right]^{1/2} Y\right)^2 + \frac{L}{\Delta L}\sigma_{meas}^2}$$

where $\sigma_{phase}$ is the RMS residual phase error, $\Phi(f)$ is the laser phase noise spectrum expressed in radians per root Hertz referred to 1 m optical path difference which is integrated over the relevant frequency band $f_{Low} \rightarrow f_{High}$, $\Delta L$ is the optical path length of the delay coil (with time equivalent $\Delta\tau$), Y represents the maximum uncompensated path length, a $\sigma_{meas}$ is the RMS phase error associated with a single differential phase measurement in the compensator interferometer, and L is the target return optical path length (i.e. to the target and back). In the worst case the value of Y will be equal to $\Delta L/2$, but will in general be less than this. An optimum delay length $\Delta L$ can be found by solving this expression for minimum residual phase noise.

The invention has particular utility in radar or LIDAR systems, although it will be appreciated that it may be used in other areas, such as fibre sensors, or other areas where a compact size and coherent operation at long ranges (compared to the coherence length of the signal generator source) are desired. This includes some types of radar, for example, as described above.

It should also be noted that, whilst the description above has been for a single discrete target, the technique also applies to multiple discrete and continuous down-range scatterers. To this end, it will be appreciated that appropriately configured embodiments of the invention (i.e. those that store the measurements from the compensation and measurement interferometers in suitable longer term memory) allow for post-processing of the returns, to apply the phase noise reduction at multiple ranges if required. Some embodiments may be configured to implement this in real-time also, of course.

The invention claimed is:

1. A system comprising:
   a) a signal generator for providing a signal,
   b) a splitter for splitting the signal from the signal generator and directing it to a measurement path and a compensation path, wherein:
      i) the measurement path comprises a measurement interferometer having a splitter for splitting the signal into a first and a second part, the measurement interferometer being arranged to transmit the first part to a remote target, and to receive reflections therefrom, and to combine the received reflections with the second part in a measurement interferometer mixer, and
      ii) the compensation path comprises a compensation interferometer arranged to split its input signal into a first, delayed path, and a second, undelayed path, and to combine the first and second paths in a compensation interferometer mixer to produce an output bearing information pertaining to a phase difference between the two paths, the relative delay between the first and second paths being a predetermined time $\Delta\tau$;
   c) a processor configured to calculate a phase compensation figure by digitally measuring a phase change across n successive passes through the compensation interferometer over a time $n\Delta\tau$, where $n\Delta\tau$ is equal to n times the predetermined time $\Delta\tau$, and subtracting the calculated phase compensation figure from the output of the measurement interferometer,
   wherein the system is arranged to calculate a range L/2 to the remote target based upon the compensated output from the measurement interferometer, said range giving a time delay $\tau$ to the received reflections as compared to the second part, and wherein the phase compensation figure is calculated under the condition that $|\tau - n\Delta\tau| \leq \Delta\tau/2$.

2. A system as claimed in claim 1 wherein the system is arranged to select a value for n a based on an estimate of the range to the target.

3. A system as claimed in claim 1 wherein the delay time $\Delta\tau$ of the compensation interferometer is chosen based upon a combination of errors associated with multiple measurement of the phase error from the compensation path, and the size of $\Delta\tau/2$.

4. A system as claimed in claim 1 wherein the values of n and $\Delta\tau$ are chosen to reduce residual phase noise following the processing carried out in step (c).

5. A system as claimed in claim 4 wherein the length of delay coil $\Delta L$ in the compensation interferometer, and hence the values of n and $\Delta\tau$ are chosen, to produce a minimum value for $\sigma_{phase}$ in the equation:

$$\sigma_{phase} = \sqrt{\left(\left[\int_{f_{Low}}^{f_{High}} |\Phi(f)|^2 df\right]^{1/2} Y\right)^2 + \frac{L}{\Delta L}\sigma_{meas}^2}$$

where $\sigma_{phase}$ is the RMS residual phase error, $\Phi(f)$ is the laser phase noise spectrum expressed in radians per root Hertz referred to 1 m optical path difference which is integrated over the relevant frequency band $f_{Low} \to f_{High}$, $\Delta L$ is the optical path length of the delay coil (with time equivalent $\Delta\tau$), Y represents the maximum uncompensated path length, (with a maximum value of $\Delta L/2$), a $\sigma_{meas}$ is the RMS phase error associated with a single differential phase measurement in the compensator interferometer, and L is the target return optical path length.

6. A system as claimed in claim 1 wherein the compensation interferometer is arranged to have a delay time $\Delta\tau$ of less than 10% of the flight time of the signal traversing twice an expected in-use target range.

7. A system as claimed in claim 1 wherein the compensation interferometer is arranged to have a delay time $\Delta\tau$ of less than 1% of the flight time of the measurement signal traversing twice an expected in-use target range.

8. A system as claimed in claim 1 wherein the compensation interferometer mixer provides a complex output allowing in-phase (I) and quadrature (Q) signals to be extracted.

9. A system as claimed in claim 1 wherein the measurement interferometer mixer provides a complex output allowing in-phase (I) and quadrature (Q) signals to be extracted.

10. A system as claimed in claim 1 wherein the measurement path contains a modulator for modulating the signal before it is transmitted to the target.

11. A system as claimed in claim 1 wherein the signal generator is a laser.

12. A system as claimed in claim 11, wherein the measurement path contains a modulator for modulating the signal before it is transmitted to the target, wherein the modulator is an acousto-optic modulator.

13. A system as claimed in claim 1 wherein the signal generator is a radio frequency signal generator.

14. A system as claimed in claim 1 wherein the delay path of the compensation interferometer comprises an optical fibre.

15. A system as claimed in claim 11 wherein the delay path comprises of a coaxial cable.

16. A system as claimed in claim 1 wherein the system is a LIDAR system or a radar system.

17. A system as claimed in claim 16 wherein the system is arranged to have a slant range of at least 1 km.

18. A system as claimed in claim 1 wherein values of phase noise compensation are calculated for different target ranges, and are used to correct the output of the measurement interferometer at different ranges.

19. A method for compensating for phase noise in a LIDAR or radar, comprising the steps of:
   i) generating a signal;
   ii) splitting the signal into a measurement signal and a compensation signal and directing the measurement signal to a measurement path and directing the compensation signal to a compensation path;
   iii) transmitting a first part of the measurement signal in the measurement path to a remote target, and mixing returns from the remote target with a second part of the measurement signal in a measurement interferometer mixer to down-convert the returns;
   iv) passing the compensation signal into a compensation interferometer arranged to split its input signal into a first, delayed path, and a second, undelayed path, wherein a relative delay between the first and second paths being a predetermined time $\Delta\tau$;

v) calculating a phase compensation figure by measuring a phase change across n successive passes through the compensation interferometer over a time $n\Delta\tau$, where $n\Delta\tau$ is equal to n times the predetermined time $\Delta\tau$;
vi) subtracting the calculated phase compensation figure from the down-converted output of the measurement interferometer mixer of step (iii); and
vii) calculating a range L/2 to the target based upon the compensated output from the measurement interferometer, wherein said range giving a time delay $\tau$ to the received reflections as compared to the second part, and wherein the phase compensation figure is calculated under the condition that $|\tau-n\Delta\tau|\leq\Delta\tau/2$.

\* \* \* \* \*